United States Patent [19]

Ando

[11] 3,892,874

[45] July 1, 1975

[54] METHOD OF MANUFACTURING SEASONED INSTANT COOKING NOODLES PACKED IN A CONTAINER

[76] Inventor: Momofuku Ando, 7-34 Masumicho, Osaka, Japan

[22] Filed: Oct. 10, 1973

[21] Appl. No.: 405,061

Related U.S. Application Data

[63] Continuation-in-part of Ser. No. 140,253, May 4, 1971, abandoned.

[30] Foreign Application Priority Data

Aug. 10, 1970 Japan............................ 45-69928

[52] U.S. Cl................. 426/303; 426/347; 426/439
[51] Int. Cl............................................. A23l 1/16
[58] Field of Search ........... 426/158, 343, 347, 438, 426/439, 451, 303

[56] References Cited
UNITED STATES PATENTS

| | | |
|---|---|---|
| 3,138,462 | 6/1964 | Katz et al........................... 426/451 |
| 3,251,694 | 5/1966 | Scotland............................ 426/451 |
| 3,537,862 | 11/1970 | Peters et al........................ 426/451 |
| 3,723,132 | 3/1973 | Hodge et al...................... 426/347 X |
| 3,728,130 | 4/1973 | Egan et al........................... 426/158 |

*Primary Examiner*—S. Leon Bashore
*Assistant Examiner*—Arthur L. Corbin
*Attorney, Agent, or Firm*—Ernest G. Montague; Karl F. Ross; Herbert Dubno

[57] ABSTRACT

Seasoned instant-cooking noodles, packed in a container, are produced by boiling raw noodles, spraying them with a seasoning liquid at a temperature below 5°C, and removing the excess of the seasoning liquid from the noodles, sprinkling them with edible oil, placing the noodles in a frame, dehydrating the noodles by immersing in hot edible oil, placing the dehydrated noodles at a high temperature into cup-shaped containers of insulating material, sealing the containers, and cooling same.

3 Claims, 1 Drawing Figure

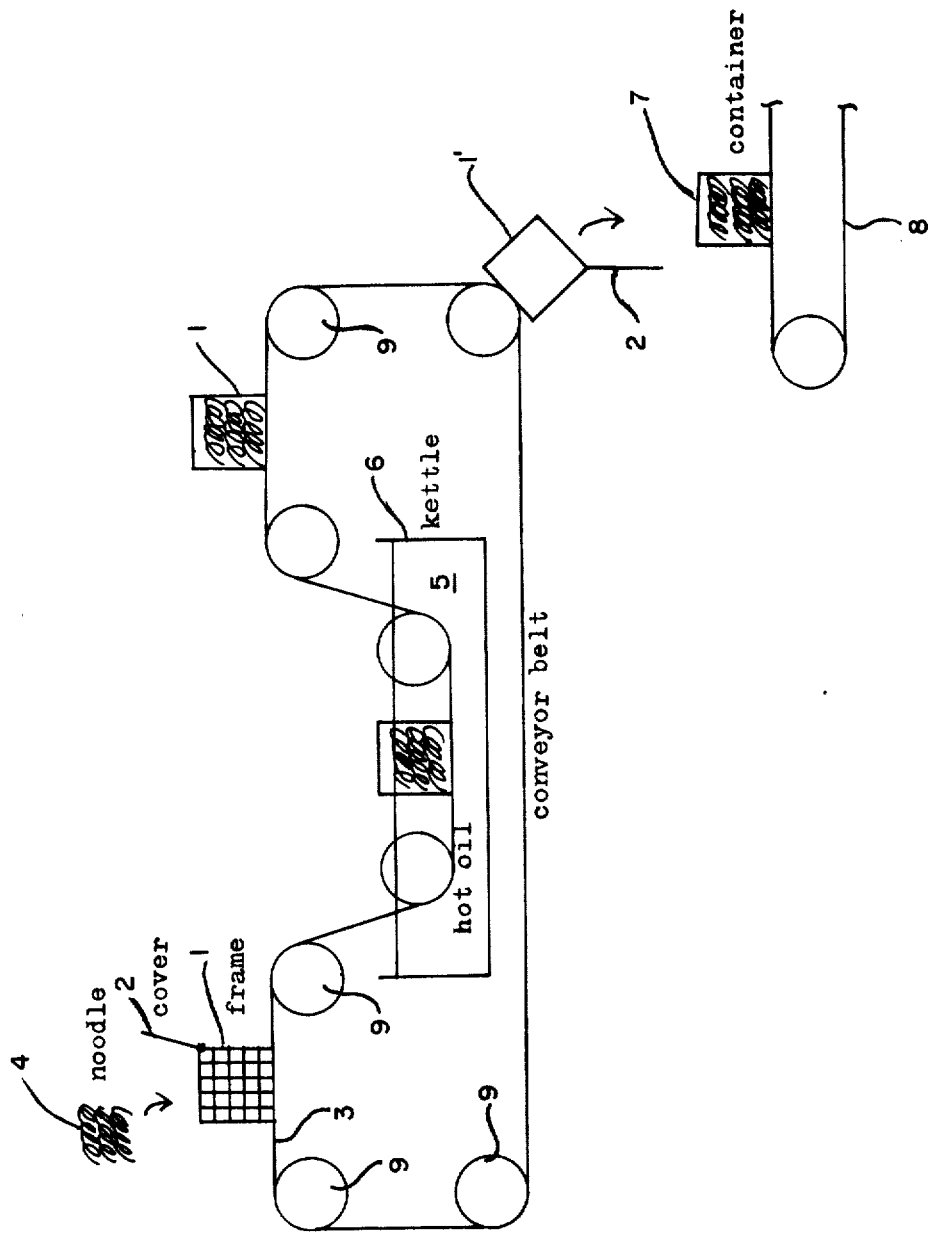

METHOD OF MANUFACTURING SEASONED INSTANT COOKING NOODLES PACKED IN A CONTAINER

The present application is a continuation-in-part application of my co-pending patent application Ser. No. 140,253, filed May 4, 1971, and now abandoned.

The present invention relates to a method of manufacturing instant-cooking seasoned noodles, which are packed in a container for longterm storage.

It is generally known that the taste appeal of noodles is determined mainly by such factors as their elasticity, degree of gelatinization, luster, and uniformity.

In Japan, instant-cooking noodles had to meet a demand of more than 3,500,000,000 meals per year during the past decade or so, because they generally satisfy these basic taste requirements beside offering the benefits of rapid cooking and good storability. When unseasoned precooked noodles are boiled in water for three or four minutes, they acquire the taste of cooked raw noodles.

However, the seasoned instant-cooking noodles which are presently available on the market, and which require only boiling for 2 or 3 minutes after addition of boiling water, actually are not able to gain a taste that is even similar to that of regularly cooked raw noodles. Their surface is softened and their seasoning is dissolved out by the boiling water; thus, they cannot offer the toughness and smoothness which the boiled raw noodles can provide.

The reason for this is believed to be the following:

First, an imperfect heat conversion of starch and protein in the noodles, may occur during the manufacturing process. Secondly, there may be insufficient heat conduction to the noodles in the instant cooking, because the container which is usually made of porcelain or metal absorbs heat and lets steam escape from the gap between the container and its lid whereby the temperature of the boiling water is sharply reduced.

It is an object of the present invention to provide a method of imparting to precooked noodles, flavored with a seasoning agent, the taste appeal of regularly boiled noodles. As a consequence of research for many years I have found in accordance with the present invention that the above-mentioned drawbacks of the prior art can be overcome by giving special consideration not only to the manufacturing procedure but also to the packaging of the precooked noodles.

In the conventional manufacture seasoned instant noodles, raw noodles are boiled, dipped or sprayed with heated liquid for seasoning, and are then dehydrated and treated with hot oil. When the boiled noodles are observed under a microscope, there are found a number of pinholes in their surfaces. In the continuous prior art method, the seasoning liquid gradually increases in temperature as the boiled noodles transfer their heat to it. The noodles, therefore, are coated only on their surface with the seasoning liquid.

According to the present invention, initially raw or unprocessed noodles are boiled so as to gelatinize the noodles; then the seasoning liquid, which is kept at 5°C or below by cooling and circulation, is sprayed on the boiled noodles which are still at a high temperature. Sudden cooling of the boiled noodles by this spray allows the surface layer to shrink in order to seal the pinholes and thus to prevent an excess absorption of the liquid. Therefore it remedies the defect of the conventional technique which allows the noodles to swell and lose their toughness.

The effect of a sudden cooling of the boiled noodles is the same as that encountered during the cooking of raw noodles, where the boiled raw noodles are ordinarily treated with cooling water. This is comparable to the pores of the human skin being opened in a bath and thereafter closing when the skin is showered with water.

Furthermore, in the conventional manufacture of seasoned noodles, it has been the practice merely to season the noodles by a dipping or spraying process and to facilitate softening of the dehydrated noodles during the instant cooking by making the noodles as thin as possible. Consequently, they easily break upon frying in the dehydration process, and this results in brittle products with rough surfaces.

In the method according to the present invention, the seasoning liquid is kept at a low temperature by a freezer, and the noodles are constantly subjected to a difference in temperature between the boiled noodles and the seasong liquid. Consequently, there is a further benefit in that no aging of the product occurs during the instant cooking and the boiled noodles are not highly frangible after dehydration but have considerable flexibility.

The noodles thus sprayed with the seasoning liquid at a lower temperature are passed through a narrow passage so as to remove the excess liquid. Next, while a suitable amount of oil is dropped upon the noodles, they are subject to vibration on a cam-actuated operation on a conveyor, so as to separate them and to coat the noodles perfectly with liquid. The noodles, then, are cut to a predetermined length and put into a frame, care being taken to avoid a diminution of the seasoning due to relative motion of the noodles. Finally, the noodles on the conveyor are passed through an oil-heated kettle at a temperature of about 145°C well about the boiling point in order to dehydrate them to a desired water content.

In the prior art, precooked noodles (at about 120°C) were cooled immediately and packaged in polyethylene bags.

According to the present invention, the precooked noodles while still at a high temperature are packaged into a container of insulating material, without cooling, whereupon the container is immediately sealed with a cover. Then, the noodles in the sealed container are passed into a cooling chamber to complete the production.

The sealed cup containing the hot noodles is cooled with development of a partial vacuum in the container by the difference in temperature between the inside and the outside of the cup, with a resulting sterilizing effect. Also there is no chance for bacteria to enter the container during the packing. No oxidation or aging of the noodles occurs because the noodles are kept just in the gelatinized state upon frying. Tight sealing with the cover is insured by the partial vacuum in the container.

As compared with the product of the prior art, which cannot be kept longer than about 3 months, the product produced by the method according to the present invention can be kept for about 1 year, thus for about 4 times the maximum storage period of the prior art without any change in the oil and the seasoning materials which are absorbed in the noodles.

The precooked-noodles of the prior art were generally used after being boiled in a pan or after boiling water was poured on them. Thereafter, it usually becomes necessary to place them in a vessel such as a china bowl.

Since the instant noodles obtained by the method according to the present invention are packed in a cup-like container, there is no need for any other vessel. Therefore, my present method has the advantage that the noodles can be used wherever boiling water is available.

In the conventionally precooked seasoned noodles, to be reheated with boiling water, only their surface is softened by this treatment and their degree of gelatinization may be about 60%, although they appear to be completely softened. In contrast, the seasoned noodles produced by the method according to the present invention exhibit a degree of gelatinization that can reach more than 90% while the taste of the noodles is remarkably improved.

The above and other features of my present invention will be more clearly apparent from the following detailed description given in connection with the accompanying drawing, the sole FIGURE of which shows a conveyor system for carrying out certain steps of the present process.

As illustrated schematically, a frame 1 which is all mesh or constitutes a cage is provided with a mesh cover 2, which is not essential, hinged at the upper edge of the frame 1.

The frame 1 is fixed to and transported by a conveyor belt 3, the latter being preferably endless and mounted on rollers 9. The cover 2 of the frame is opened and the suitably cut and seasoned noodles 4 (after being gelatinized, sprayed with the seasoning liquid at a temperature below about 5°C, and sprinked with edible oil) are inserted into the frame 1. After closure of the cover 2, the frame is dipped into hot edible oil 5 at about 145°C for about 2 minutes, the hot oil being inside a kettle 6, whereby the noodles are dehydrated to a desired water content. The frame 1 is then removed from the oil and conveyed to a position 1' where it is turned over to automatically open the cover 2 so that the noodles fall therefrom into a packing container 7, preferably a cup-shaped vessel of insulating material, carried on another conveyor 8. The container 7 is then sealed with a cover and passed into a cooling chamber (not shown).

The following is a specific but nonlimiting example of the process according to my invention.

EXAMPLE

25 Kg of wheat flour, 450 g of salt, 50 g of potassium carbonate, 100 g of egg, and a suitable amount of water were mixed for 15 minutes, the mixture was aged for 10 minutes, and then raw noodles were produced by a conventional method. (The thickness of the noodles was less than 1.0 mm, and the cutting was carried out by No. 24 square lip.) A seasoning liquid, which was made by blending condensed extract of meat such as pork, chicken and sea foods, salt, soy, chemical seasonings, and spices, and which was cooled to 5°C by a freezer, was sprayed on the freshly boiled noodles. Then the noodles were passed between felt rollers to squeeze out the excess seasoning liquid, whereupon a few drops of sesame oil were sprinked upon them. They were placed in a frame and dehydrated for 2 minutes in animal or vegetable oil at a temperature of at about 145°C. Next, the dehydrated noodles still at high temperature were divided and put into cup-shaped containers with covers both made of foamed polystyrene, and sealed. Immediately thereafter, these containers were cooled and wrapped to complete the production.

I claim:

1. A method of converting raw noodles into precooked noodles flavored with a seasoning agent, comprising the steps of successively:

gelatinizing said raw noodles by boiling;

immediately subjecting the boiled noodles to a spray of a liquid containing a seasoning agent, said liquid having a temperature below about 5°C;

squeezing excess liquid containing seasoning agent from said noodles;

sprinkling edible oil upon said noodles;

immersing said noodles in a hot edible oil at an elevated temperature substantially above the boiling point of water for partially dehydrating same;

packing said noodles substantially at said elevated temperature in a container;

sealing said container; and then cooling said container and its contents.

2. A method as defined in claim 1 wherein said elevated temperature is approximately 145°C.

3. A method as defined in claim 2 wherein said noodles are immersed in said hot oil at said elevated temperature for about 2 minutes.

* * * * *